United States Patent [19]

Hibyan et al.

[11] Patent Number: 4,585,393
[45] Date of Patent: Apr. 29, 1986

[54] FIBER REINFORCED/EPOXY MATRIX COMPOSITE HELICOPTER ROTOR YOKE

[75] Inventors: Edward S. Hibyan, Trumbull; Thomas J. Toner, Milford; Peter C. Ogle, Woodbridge, all of Conn.

[73] Assignee: United Technologies Corporation, Hartford, Conn.

[21] Appl. No.: 477,701

[22] Filed: Mar. 22, 1983

[51] Int. Cl.$^4$ .............................................. B64C 27/38
[52] U.S. Cl. ................................ 416/134 A; 416/230; 416/141
[58] Field of Search ............... 416/134 A, 138 A, 141, 416/230 A, 244 R

[56] References Cited

U.S. PATENT DOCUMENTS

| | | | |
|---|---|---|---|
| 3,669,566 | 6/1972 | Bourquardez et al. | 416/230 A X |
| 4,195,967 | 4/1980 | Weiland | 416/230 A X |
| 4,255,087 | 3/1981 | Wackerle et al. | 416/134 A X |
| 4,293,276 | 10/1981 | Brogdon et al. | 416/134 A |
| 4,321,013 | 3/1982 | Schwarz et al. | 416/244 C X |
| 4,345,876 | 8/1982 | Schwarz et al. | 416/141 X |
| 4,352,632 | 10/1982 | Schwarz et al. | 416/134 A |
| 4,360,337 | 11/1982 | Frommlet et al. | 416/141 |
| 4,369,019 | 1/1983 | Lovera et al. | 416/141 X |
| 4,425,082 | 1/1984 | Mussi et al. | 416/230 A X |
| 4,427,340 | 1/1984 | Metzger et al. | 416/141 |

FOREIGN PATENT DOCUMENTS 2919040 11/1980 Fed. Rep. of Germany ...... 416/141

Primary Examiner—Everette A. Powell, Jr.
Attorney, Agent, or Firm—Alan C. Cohen

[57] ABSTRACT

A composite helicopter hub yoke is described. The yoke is made up of glass fibers unidirectionally oriented in the direction of principle stress, i.e. along the length of the yoke. The yoke also has clevis sections on either end and the clevis sections additionally contain multiaxially oriented multiple plies of unidirectionally oriented continuous graphite fibers interleaved with the unidirectionally oriented continuous glass fibers to produce crack resistance, damage tolerance, and integrity inspectability.

1 Claim, 3 Drawing Figures

FIBER REINFORCED/EPOXY MATRIX COMPOSITE HELICOPTER ROTOR YOKE

CROSS REFERENCE TO RELATED APPLICATIONS

Attention is directed to the following copending, commonly assigned U.S. patent applications, filed on even data herewith: Ser. No. 477,696 filed in the names of Peter C. Ogle, George J. Wehnert, Francis E. Byrnes, Jr. and entitled "A Fiber Reinforced/Epoxy Matrix Composite Helicopter Rotor Main Hub Plate"; Ser. No. 477,709 filed in the names of Peter C. Ogle, George J. Wehnert, Thomas J. Toner, Francis E. Byrnes, Jr., and Edward S. Hibyan and entitled "Fiber Reinforced/Epoxy Matrix Composite Helicopter Rotor Torque Tube"; and Ser. No. 477,708 filed in the names of Peter C. Ogle, George J. Wehnert, Francis E. Byrnes, Jr., Thomas J. Toner and Edward S. Hibyan and entitled "Composite Helicopter Rotor Hub".

DESCRIPTION

1. Technical Field

The field of art to which this invention pertains is helicopter rotor components and particularly helicopter rotor yokes.

2. Background Art.

Historically, helicopter main rotor hubs have been made of high strength, lightweight, critical metals or alloys. Although these metal components have performed adequately, there are a number of drawbacks inherent to these materials. Three important areas where these materials possess less than optimum features are weight, availability and fail-safeness.

Weight has always been a consideration in helicopter construction and with increasing fuel costs it has become a primary objective, i.e. to reduce the weight of the overall helicopter by using lighter materials. At present aluminum and titanium are used extensively because of their light weight and strength, however, there is a constant search for lighter and stronger materials. In addition, these lightweight metals are classified as "critical" materials with their primary availability being through importation. As has been demonstrated by the oil embargoes of past years, reliance on foreign sources for these materials is not desirable. Furthermore, these metals do not impart a damage tolerance to their components. That is, when a metal component starts to weaken, through fatigue or otherwise, cracks are generated. These cracks continue to grow quickly as there is nothing to stop their propagation and the component part can fail completely. As can be appreciated, this lack of damage tolerance can be disastrous in a helicopter.

In order to overcome the shortcomings of such metal components, the industry has taken two approaches. One is to build a redundant component so that should one fail the other will allow for a safe landing. The second is to overdesign the particular part such that it would have much greater strength than would normally be required under normal circumstances. Both of these approaches add weight to the aircraft as well as increased cost and reliance on critical metals.

Recently, composite materials have been used as replacement parts for many metal components due to their light weight and relatively low cost. For example, composite materials are now being used in main structural components such as main rotor blades and tail rotor assemblies on helicopters. However, it is not always practical to replace a metal component with a composite material due to particular design considerations and shortcomings in the composite physical properties.

Composite rotor hubs have been designed using a laminated structure of fiber reinforced resin e.g. note British Pat. No. 2,092,541. Such hubs are of such complicated design as to make them costly to fabricate, and having fewer component parts, produce an increased number of failure points.

Accordingly, what is needed in this art are damage tolerant, relatively inexpensive and lightweight composite components capable of withstanding the forces developed in a helicopter rotor hub assembly.

DISCLOSURE OF THE INVENTION

The present invention is directed to a main helicopter rotor hub composite yoke. The yoke is made up of layers of graphite fibers and glass fibers laid up and interleaved in an epoxy resin matrix in specific manner. The yoke is U-shaped with a clevis section at each end. The glass fiber reinforcement is present in the yoke as unidirectionally oriented continuous fibers along the length of the yoke. In the clevis sections multiaxially oriented plies of continuous unidirectionally oriented continuous graphite fibers are interleaved with the continuous glass fibers so as to produce crack resistance, damage tolerance, and integrity inspectability to the yoke, without the need for redundant parts or overdesigned components.

BEST MODE FOR CARRYING OUT THE INVENTION

Figure 1:
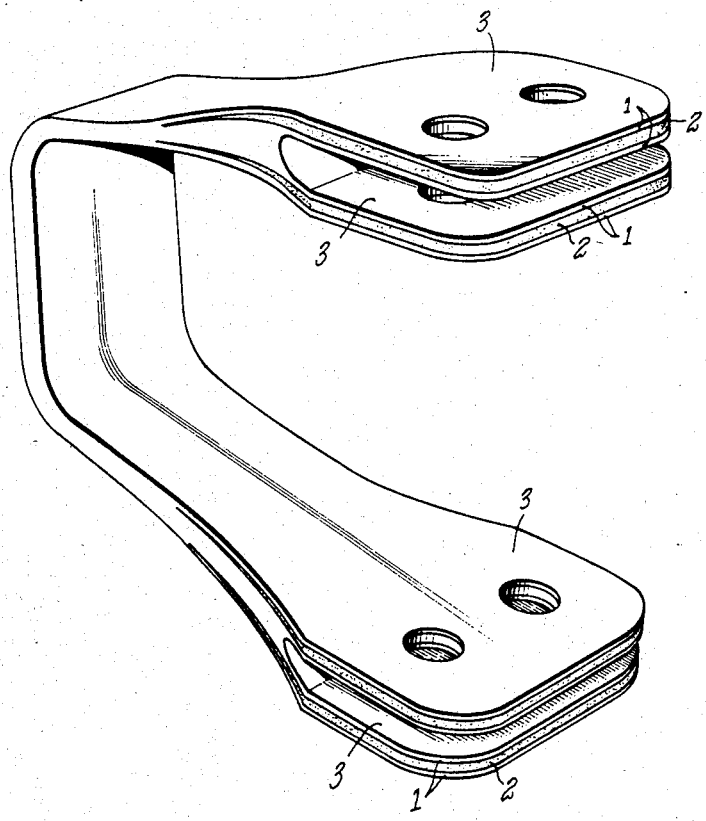
FIG. 1 shows a composite yoke according to the present invention.

As the graphite fiber reinforcement, high strength graphite fiber may be used which has a minimum filament modulus of $30 \times 10^6$ psi. These filaments may be purchased preimpregnated with an epoxy resin in the form of a multifilament collimated graphite tape in sheet form from Narmco Materials Inc., Costa Mesa, Calif. These tapes range anywhere from about 1 to about 18 inches wide and are typically used with a width of about 12 inches. In this sheet form each sheet or ply of the graphite fiber bundles is about 0.012 inch in thickness, although sheets with 0.006 inch thicknesses are also available. The cured graphite/resin composite should contain about 50% to about 65% fibers by volume and a unidirectional cured layer should have a tensile modulus of about $17 \times 10^6$ to about $20 \times 10^6$ psi at room temperature. The individual fibers are generally about 0.35 to about 0.399 mil in diameter.

The relative amounts of the fibers are preferably constituted such that there are substantially equal effective amounts of fibers oriented in the 0° and ±45° directions. This is roughly equivalent to equal thicknesses of 0° oriented fibers and ±45° oriented fibers with a slight excess of 0° oriented fibers present because of the relative softness of the glass fibers as compared to the graphite fibers.

While any glass fiber material with the requisite physical properties can be used, the preferred glass fiber is an S-type which can also be obtained preimpregnated with epoxy resin from Narmco Materials Inc. The cured glass fiber/resin layer should have about 45% to about 60% fiber content by volume and a tensile strength of about 125,000 psi minimum as well as a longitudinal tensile modulus of about $5.1 \times 10^6$ to about $6.3 \times 10^6$ psi both measured at room temperature. As with the graphite fibers, the preimpregnated glass fibers are available in fiber bundle tapes anywhere from 1 inch to 18 inches in width and about 0.0125 inch in thickness. Such Tapes cure out to a thickness of about 0.010 inch and are typically used in ⅛ inch widths.

If the glass fibers are applied to the mold surface in forming by filament winding as opposed to hand laying it is preferred to use pre-resin impregnated fiber bundle tows which range anywhere from 1/10 of an inch to 1 inch in width having the same thickness described above.

The epoxy resin matrix should be selected so as to be compatible with the fiber reinforcement. It is also desirable that the epoxy resin be satisfactorily curable at low pressures i.e. about 20 to about 100 psig. Three such resin systems are available commercially, two from U.S. Polymeric designated as Resin Number 773 and Resin Number E7K8, and the other from Narmco Materials Inc. designated as Resin Number 5225. Also as stated above, while the graphite or glass fibers can be laid up and subsequently treated with the epoxy resin either by brushing or otherwise applying a coating composition of suitable carrier of the epoxy resin or resin coated just prior to laying up, the fibers are preferably laid up as commercially purchased, i.e. preimpregnated with the epoxy resin.

Figure 3:
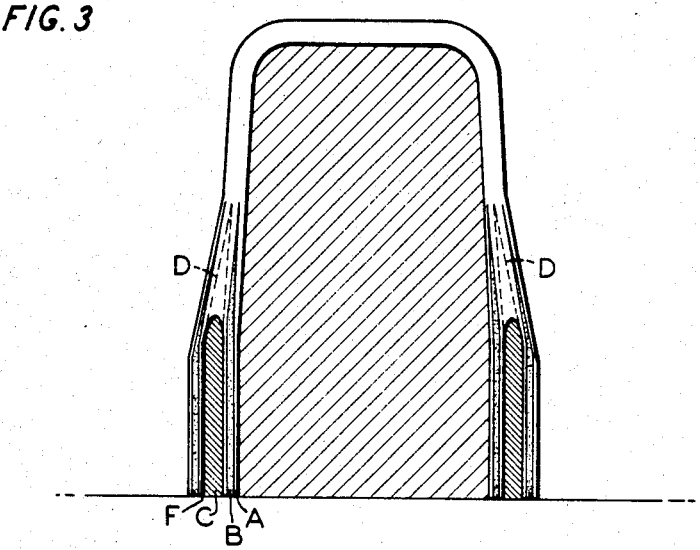
FIG. 3 shows a mold assembly for the yoke.

While the main body of the yoke can be formed by filament winding the glass fibers on a mandrel, the yoke is typically made by hand laying approximately 12 inch wide tapes of glass fiber preimpregnated with epoxy resin on a male mandrel. As shown in FIG. 3, the inner portion of the yoke A is laid up first with the layers of glass fiber preimpregnated tapes. It should be noted that the thicknesses of the glass fiber layers and graphite fiber layers as well as the overall thickness of the yoke are determined by the projected applied loads the yoke will see. This in turn is determined by the particular rotor system the component is being designed for. Typically, the strength properties of the yoke are designed to duplicate the strength of the metal parts being replaced, for example, the spindle cuff etc. The graphite packs B as described above are next inserted and are tapered by droping plies off so the peak shear stress in the yoke is kept to a minimum. Although as stated above the relative thicknesses are determined by the strength properties required for any particular system design, typically the thickness of the graphite pack at its thickest portion will be equal to the thickness of the glass fiber layers surrounding it on either side. This is true for both sides of the clevis.

The graphite fiber packs are comprised of multiaxially oriented multiple plies of unidirectionally oriented graphite fibers. That is to say that the graphite fibers in any one ply are continuous and unidirectionally oriented but the plies are stacked one atop the other in 0°, ±45° orientation.

Following insertion of the graphite pack the laying up of the continuous glass fibers is resumed. When an adequate thickness of the glass fiber tapes is laid up clevis spacers C, are inserted to produce the attachment spaces between the arms of the clevises 3 in FIG. 1. The laying up of the glass fibers and graphite fiber packs is repeated on the other side of the clevis spacer.

When the clevis spacer is inserted a wedge D of unidirectional fiberglass pack is inserted along with the spacer which separates the clevis sections and is designed to minimize the tendency of the clevis to split apart under impact loading. This is the same resin impregnated glass fiber utilized for the rest of the yoke.

If desired, to provide additional strength, a woven fiberglass scrim F can be placed on the interior of the clevis cavity prior to curing of the yoke. Typically such woven glass fiber scrim has 0°/90° glass fiber orientation and is approximately 0.03 inch thick. Other typical measurements for such a yoke are a clevis opening roughly equal to the length of the triangular shaped pack which is roughly equal to the length of the graphite pack taper portion. The body of the yoke (e.g. base of the U-shaped section) and the individual arms of the clevis sections are also typically about the same width. Although these measurements will vary depending on hub design and load to be applied.

The thus formed yokes are then conventionally autoclave cured and appropriate bolt hole attachments provided. A conventional vacuum bag can be used during curing to assist in holding the torque tube component parts in place.

Typically epoxy resin systems are used which cure at about 340° F. to about 360° F., at pressures of about 60 psig to about 100 psig, in about 2 to about 4 hours. In this instance, the entire assembly is placed in an autoclave and heated to approximately 350° F. at approximately 80 psig for approximately 2 hours to compress the assembly and cure the epoxy resin. The result is a yoke requiring only drilling of the attachment holes.

Typically the basic mold used is wider than the width of the desired yoke width so, for example two or more yokes can be machines from the cured lay-up. An alternative manufacturing aproach is to filament wind the unidirectional glass fibers with the graphite packs layed up at an appropriate time, with the yokes back to back. In this manner any quantity of yokes in increments of two (2, 4, 6, 8, etc.) can be filament wound simultaneously. This could result in substantial savings in manufacturing time and man hours. Conventional metal plugs or other attaching means can be bonded in at this time.

Figure 2:
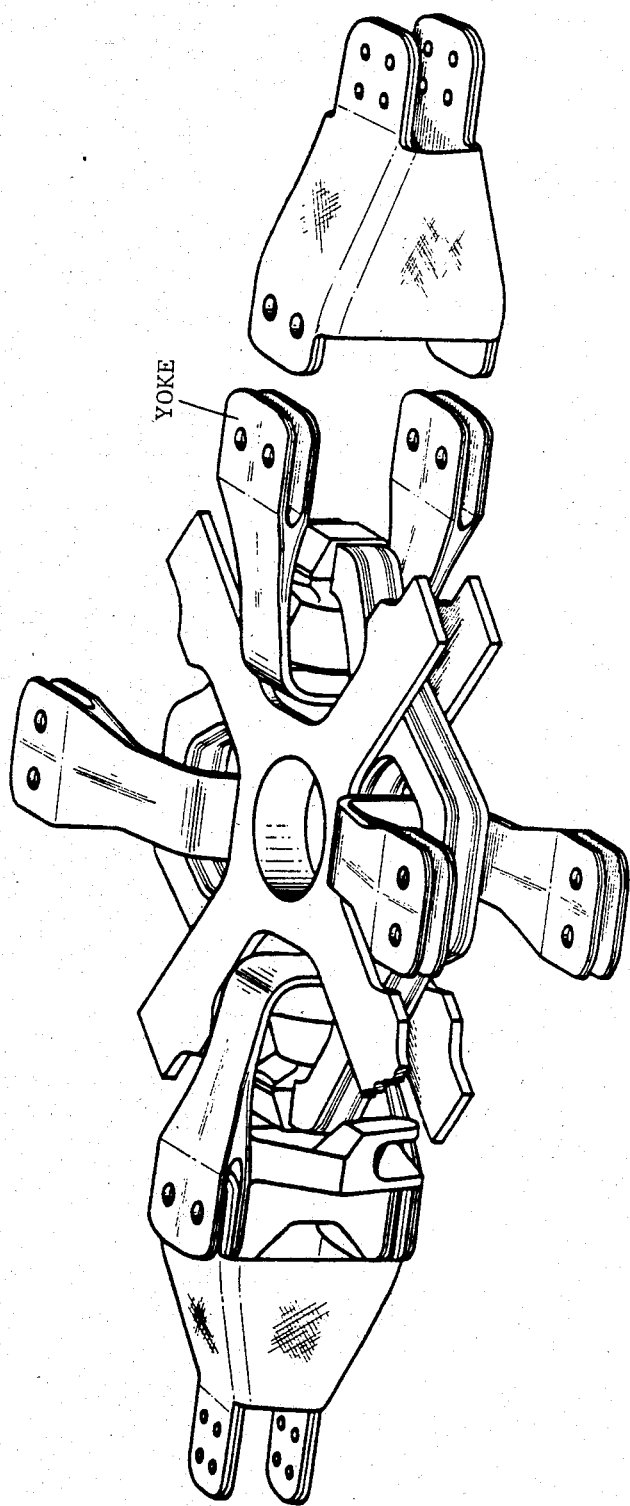
FIG. 2 shows a composite rotor hub assembly containing a composite yoke according to the present invention.

In FIG. 1 a yoke according to the present invention is shown with the glass fiber portion shown as 1 and the graphite packs as 2. In FIG. 2 showing a composite rotor hub assembly, the yokes according to the present invention are shown as indicated.

While there is no limit on the amount of graphite fiber which can be present in the yoke, a balance is generally made of weight considerations and overall physical properties needed for the particular design of yoke i.e. the stress-strain and load bearing limits required for any particular yoke. Through the selection of these particular materials and the unique configuration described, a relatively light weight, non-critical material, damage tolerant, less notch sensitive, component results. The component exhibits a unique combination of interlaminar shear strength, flexibility and crack resistance.

The yoke, being the intermediate structure which connects the elastomeric bearing to the torque tube and pitch arm, has two critical areas. These highly stressed areas are at the inboard radius where the yoke wraps around the elastomeric bearing, and the bolted hole attachment zone. The yoke derives damage tolerance in the wraparound area from the inherent safety of the all unidirectional glass fiber in this zone. At loads beyond ultimate the glass fiber can delaminate, but will maintain full load capability with only a stiffness reduction occurring. In the attachment area the yoke provides damage tolerance in two ways. The first is through the use of a clevis attachment to the torque tube flanges. Each half of the clevis is capable of carrying the load if the other half were to fail. In addition to being redundant, the structure is inherently crack resistant from the interleaving of the glass fiber and graphite fiber portions. The use of the clevis design has other damage tolerant ramifications. By providing a double lap joint between the yoke and the torque tube arms the structure is evenly loaded even if the attachment bolts are untorqued. By using separate bolts for the top and bottom attachments, the attachment joint effectively becomes redundant such that the loss of one bolt will not jeopardize the strength of the hub.

The yoke of the present invention has many advantages over those used in existing metal hubs. The first and foremost is the damage tolerant features which are built into the yoke which are in addition to the safe life (overall part life) design. The composite plate weight projection will result in significant weight savings in addition to being stronger and lighter than existing systems. The number of parts will also be reduced. Materials and manufacturing costs should be lower than with existing systems and due to the simpler design and greater accessibility it will be easier to replace parts. The inherent damage tolerance of the composite yoke will extend the useful life of the hub and improve the repairability which will also reduce the operational costs.

Although this invention has been shown and described with respect to detailed embodiments thereof, it will be understood by those skilled in the art that various changes in form and detail thereof may be made without departing from the spirit and scope of the claimed invention.

We claim:

1. A helicopter hub yoke comprising a U-shaped fiber reinforced epoxy matrix composite containing unidirectionally oriented continuous glass fibers, oriented in the direction of principle stress along the length of the yoke, the yoke having clevis sections at either end, each clevis section containing multiaxially oriented multiple plies of unidirectionally oriented continuous graphite fibers interleaved with the continuous glass fibers so as to produce a crack resistant, damage tolerant, integrity inspectable yoke.

* * * * *